United States Patent [19]

Mesenhimer

[11] 3,725,795
[45] Apr. 3, 1973

[54] A-C VOLTAGE DETECTOR

[75] Inventor: Lee O. Mesenhimer, Avon, Ohio

[73] Assignee: Lorain Products Corporation, Lorain, Ohio

[22] Filed: Dec. 22, 1971

[21] Appl. No.: 210,718

[52] U.S. Cl. ............... 328/135, 307/230, 307/235, 328/150
[51] Int. Cl. ................................. H03k 5/20
[58] Field of Search ...... 307/230, 235; 328/147, 149, 328/150, 135

[56] References Cited

UNITED STATES PATENTS

| | | | |
|---|---|---|---|
| 3,573,638 | 4/1971 | Cox, Jr. et al. | 307/235 X |
| 3,482,116 | 12/1969 | James | 307/235 X |
| 3,626,214 | 12/1971 | Wesner | 307/235 R |

OTHER PUBLICATIONS

R. J. Widlar et al., "Designing with Off-the-Shelf Linear Microcircuits," Application Bulletin APP-124, Fairchild Semiconductor, pg.7, January, 1966.

*Primary Examiner*—John Zazworsky
*Attorney*—John Howard Smith

[57] ABSTRACT

A circuit for indicating the presence or absence of an a-c voltage. A comparator assumes a first state when an a-c voltage applied thereto is outside a predetermined range of threshold voltages and assumes a second state when the a-c voltage is within that range of voltages. An output voltage control circuit establishes a first output voltage, to indicate the presence of an a-c input voltage, when the comparator is in its first state and establishes a second output voltage, to indicate the absence of an a-c voltage, when the comparator is in its second state. Circuitry is provided to introduce a time-delay between the time that the comparator assumes its second state and the time that the output voltage control circuit establishes the second value of output voltage. The latter time-delay is arranged to be short enough to allow the voltage detector to rapidly indicate actual interruptions in the a-c input voltage but long enough to prevent the voltage detector from indicating an a-c voltage interruption merely because the a-c voltage has varied through the above voltage range in the course of normal a-c voltage variations.

12 Claims, 4 Drawing Figures

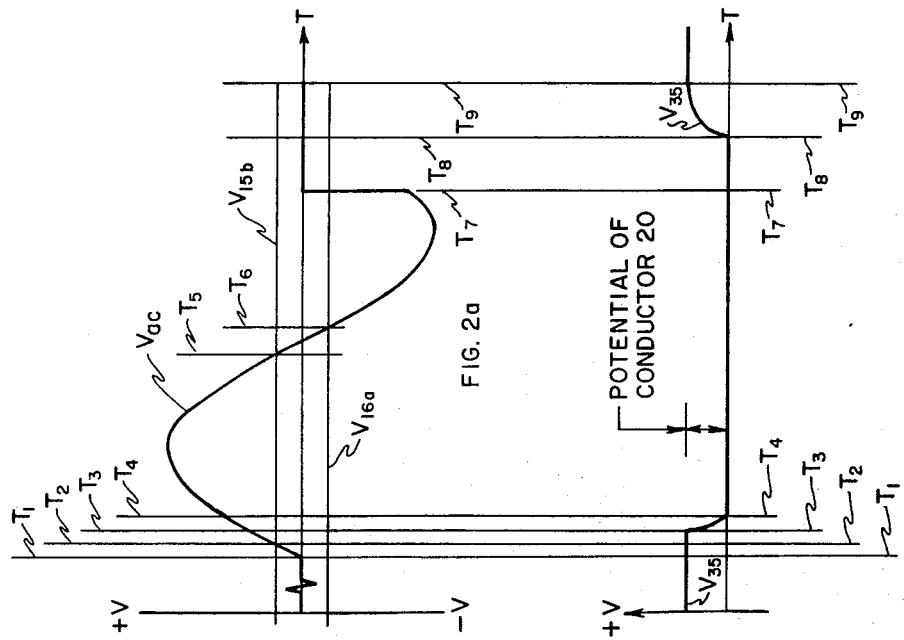
FIG. 2a
FIG. 2b
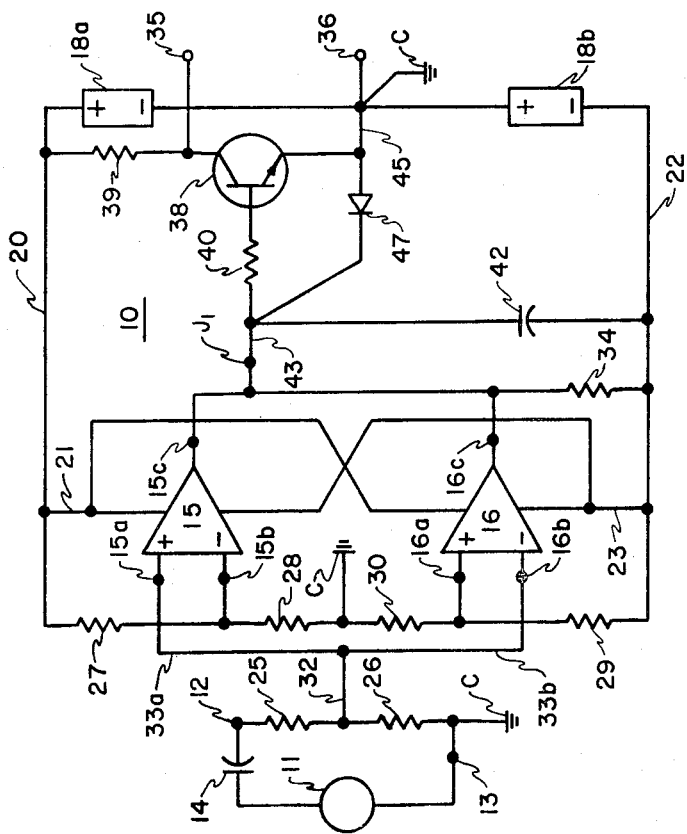
FIG. 1
INVENTOR:
LEE O. MESENHIMER
BY *J. Howard Smith*
ATTORNEY

A-C VOLTAGE DETECTOR

BACKGROUND OF THE INVENTION

The present invention relates to detector circuits and is directed more particularly to circuitry for detecting the presence or absence of an a-c voltage.

Under circumstances where the presence or absence of an a-c voltage is indicative of the operative condition of an electrical circuit, it is often necessary to provide a-c voltage detection circuitry which can give a rapid indication of an interruption or restoration of that a-c voltage. An indication that an a-c voltage has been interrupted may, for example, be utilized to activate circuitry for disconnecting an inoperative source and for substituting therefor an operative replacement. An a-c voltage detection circuit may also be used to turn on a-c voltage failure alarms.

Prior to the present invention, a-c detection circuits have presented several problems. One problem was that they respond relatively slowly to changes in the a-c voltage applied thereto. This slow response caused the desired indication of a change in the condition of the a-c voltage to be delayed for from one to several a-c voltage cycles. As a result, such circuitry was unsuitable for use in connection with many presently available high-speed monitoring and control circuits.

Another problem was that many a-c detector circuits required the flow of appreciable a-c current from the a-c circuit being monitored. This prevented the a-c detection circuit from being utilized to monitor a-c signals of low power content as, for example, certain audio frequency signals.

Still another problem was that other, more sensitive a-c voltage detector circuits were unable to distinguish the a-c signal being monitored from undesired low level signals such as induced 60 cycle hum. As a result, indications of the presence or absence of the desired a-c signal were often indistinguishable from indications of the presence or absence of unwanted signal noise.

With the present invention there is afforded a-c voltage detection circuitry which can indicate changes in the condition of an a-c voltage source within a fraction of one-half cycle of the voltage thereof, which draws negligible a-c current from the source being monitored and which is immune to low level signal noise.

SUMMARY OF THE INVENTION

It is an object of the invention to provide an improved a-c voltage detector.

Another object of the invention is to provide an a-c voltage detector which can indicate the termination or appearance of an a-c voltage during either half-cycle thereof.

Yet another object of the invention is to provide an a-c voltage detector which is insensitive to unwanted low level signals, such as, for example, signals which appear in the circuit being monitored as a result of coupling between that circuit and circuits not being monitored. This is accomplished by establishing (about the zero value of the a-c input voltage) a threshold voltage range and by preventing the circuitry from indicating the appearance of an a-c input voltage so long as the instantaneous value of the a-c input voltage is within that threshold voltage range.

Still another object of the invention is to provide an a-c voltage detector which delays the indication of an interruption in an a-c voltage for a time sufficient for the a-c voltage being monitored to vary between the limits of the above threshold voltage range. This delay allows the voltage being monitored to pass through zero, during the course of ordinary a-c polarity reversals, without causing the detector to indicate an interruption of that voltage.

It is another object of the invention to provide an a-c voltage detector which indicates the appearance of an a-c voltage without regard to the time-delay associated with the indication of an interruption in the a-c voltage.

A further object of the invention is to provide an a-c voltage detector which draws negligible current from the a-c source being monitored, that is, which has a high input impedance.

A still further object of the invention is to provide a voltage detector circuit wherein one a-c input terminal and one output terminal may be connected to a common ground.

DESCRIPTION OF THE DRAWINGS

FIG. 1 is a schematic diagram of one circuit embodying the invention,

FIGS. 2a and 2b are graphs showing various voltages appearing in the circuit of FIG. 1 as a function of time.

DESCRIPTION OF THE INVENTION

Figure 3:
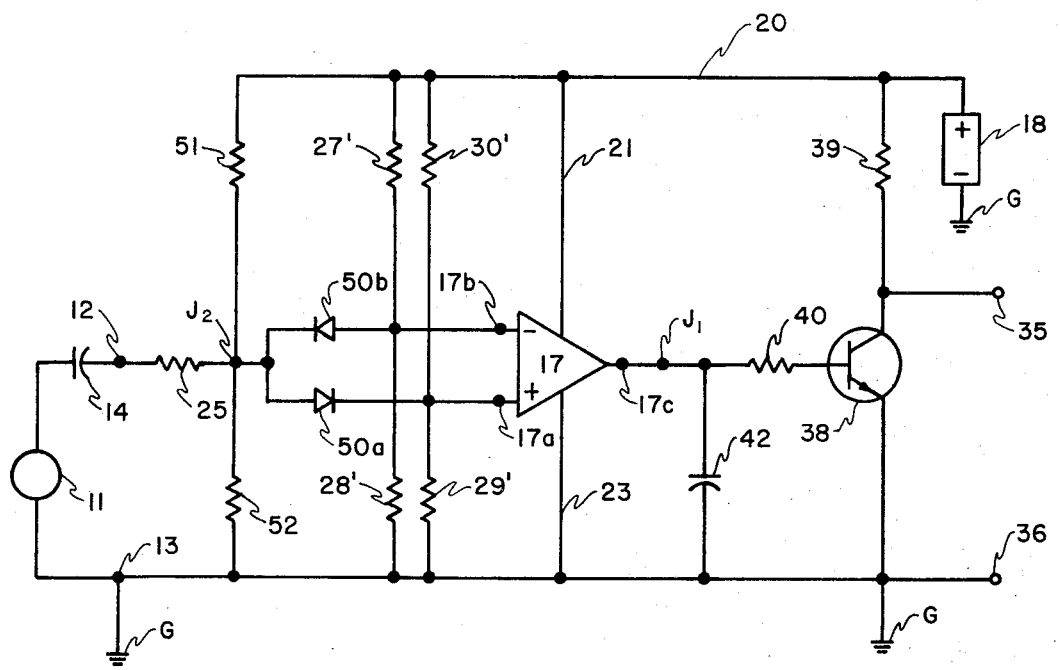
FIG. 3 is a schematic diagram of another circuit embodying the invention.

Referring to FIG. 1, there is shown an a-c voltage detector circuit 10 for monitoring the voltage of an a-c source 11. The latter source may include an a-c generator, an inverter or, in general, any network which can establish an a-c voltage at input terminals 12 and 13 of detector 10. If source 11 provides a mixed a-c and d-c voltage, the a-c component of the latter may be detected separately from the d-c component thereof by connecting a d-c blocking capacitor 14 between source 11 and detector circuit 10.

To the end that the circuit of FIG. 1 may detect the presence or absence of an a-c voltage during either half-cycle thereof, there is provided comparing means including a positive voltage comparator 15 which is responsive to positive half-cycles of the a-c input voltage and a negative voltage comparator 16 which is responsive to negative half-cycles of the a-c input voltage. Comparators 15 and 16 may comprise operational amplifiers of suitably high input impedance having respective non-inverting inputs 15a and 16a, respective inverting inputs 15b and 16b and respective outputs 15c and 16c. In the embodiment shown in FIG. 1, amplifiers 15 and 16 consist of integrated circuits of the type which generate only a positive-going output voltage in the absence of an external pull-down resistor such as resistor 34. It will be understood, however, that amplifiers 15 and 16 may also comprise operational amplifiers which generate both positive and negative-going output voltages if the negative-going output voltage are blocked by suitable diodes.

An important advantage of the present invention is that the common of the circuit can be at the same potential and connected to the ground of the a-c source being monitored. This presence the output voltage from floating at random with respect to the a-c source ground. The manner of attaining this advantage will now be described.

Operative power is supplied to amplifiers 15 and 16 from suitable d-c voltage supplies 18a and 18b through conductor pairs 20 and 21 and 22 and 23. The positive lead of source 18b is connected to the negative lead of source 18a at a junction C which has been selected for use as a circuit common. It will be understood that all points which are labeled C are at the potential of the circuit common. Thus, the ground of a-c source 11 is at the same potential as detector circuit output terminal 36.

One problem with sensitive a-c voltage detectors is that they tend to give erroneous information in the presence of undesired low level voltages such as noise or induced 60 cycle hum. In order that the circuit of the invention may be insensitive to such low level voltages and yet may be sensitive to the voltage which is to be detected, there are introduced input voltage thresholds whereby undesired low level voltages are prevented from affecting the operation of the detector. In the present embodiment, these input voltage thresholds are established by applying predetermined d-c threshold voltages to comparator inputs 15b and 16a, this being accomplished by connecting the latter inputs to d-c voltage dividers including resistor pairs 27 and 28 and 29 and 30 which serve as threshold voltage supply means. The a-c voltage which must be applied to amplifier inputs 15a and 16b to overcome these d-c thresholds may be preset by connecting an a-c voltage divider, including resistors 25 and 26, between input terminals 12 and 13 and comparator inputs 15a and 16b through signal input conductors 32, 33a and 33b.

If, for example, the voltage which source 11 establishes across resistor 26, that is, between common C and amplifier input 15a, exceeds the positive threshold voltage which voltage divider 27–28 establishes between common C and amplifier input 15b, amplifier output 15c will rise to a positive value nearly equal the potential of positive supply conductor 20. This occurs because the relatively high gain of amplifier 15 causes even a small positive voltage between input 15b and input 15a to drive amplifier output 15c to the positive limit of its output voltage.

If, on the other hand, the positive voltage which source 11 establishes across resistor 26 is less than the positive threshold voltage at amplifier input 15b, the potential of amplifier output 15c will fall below that of common C. (It is assumed for the sake of description that a capacitor 42, to be described later, has no effect at this time). This occurs because, as previously described, amplifier 15 can produce only a positive output voltage and because, in the absence of that positive voltage, output 15c is "pulled-down" toward the potential of conductor 22 by pull-down resistor 34. Thus, amplifier 15 acts as a differential switching circuit in that it switches output terminal 15c between a positive and negative potential with respect to common C in accordance with the sign of the difference between the voltages at inputs 15a and 15b.

Similarly, the potential of amplifier output 16c is either positive or negative with respect to common C depending upon whether the negative voltage which source 11 establishes at amplifier input 16b is greater or less than the negative threshold voltage which voltage divider 29–30 establishes at amplifier input 16a.

From the foregoing, it will be seen that a junction $J_1$ which is connected to both amplifier outputs will be negative from common C when source 11 causes the a-c voltage of signal input conductor 32 to be less than the threshold voltage at amplifier input 15b as well as less than the threshold voltage at amplifier input 16a, and that junction $J_1$ will be positive from common C when the a-c voltage of signal input conductor 32 exceeds either the positive threshold voltage at input 15b or the negative threshold voltage at input 16a. In other words, junction $J_1$ will be negative when the a-c voltage of signal input conductor 32 is within the range of voltages between the above positive and negative threshold voltages and will be positive when the a-c voltage on conductor 32 is not within that range of voltages. Accordingly, if the positive and negative threshold voltages are preset at values which are less than the peak positive values of the a-c values of the a-c voltage on conductor 32 but which are greater than the peak values of any undesired low-level voltages, junction $J_1$ will become positive from common C only when the a-c voltage being monitored is present between a-c input terminals 12 and 13. Thus, a positive voltage at junction $J_1$ indicates that the desired a-c voltage is present.

The presence of a negative voltage at junction $J_1$ does not, however, necessarily indicate that an a-c voltage is not present. This is because a negative voltage at junction $J_1$ may, on the one hand, indicate that no a-c voltage is present between terminals 12 and 13 and may, on the other hand, indicate that an a-c voltage is present but that its instantaneous value is such that the voltage of conductor 32 is temporarily between the above positive and negative threshold voltages as, for example, during the time just before and just after the a-c input voltage reverses polarity. To the end that these two negative voltage conditions may be distinguished, there is provided discriminator circuitry which establishes a first predetermined voltage between detector output terminals 35 and 36 when junction $J_1$ is positive from common C and which establishes a second predetermined voltage therebetween when junction $J_1$ becomes negative from common C for a time sufficient to indicate that there has occurred more than just a reversal in the polarity of the a-c input voltage. In other words, detector 10 will not establish its second predetermined output voltage, to indicate an interruption in the a-c input voltage, merely because there has occurred a reversal in the polarity of the a-c input voltage. Thus, actual as opposed to apparent a-c voltage interruptions are distinguished.

In the present embodiment, the discriminator circuitry includes voltage control means, comprising an NPN transistor 38 and a resistor 39, for controlling the voltage between output terminals 35 and 36 in accordance with the voltage at junction $J_1$, that is, in accordance with whether or not the a-c voltage on signal input conductor 32 is or is not within the threshold voltage range set by voltage dividers 27–28 and 29–30. The above circuitry also includes time-delay means, comprising a capacitor 42 and resistors 34 and 40 for modifying the control activity of transistor 38 to afford the desired time-delay between the time that the a-c input signal assumes a value within the above threshold voltage range and the time that there occurs an indication of an a-c voltage interruption at terminals 35 and 36.

The operation of the above circuitry will now be described. Referring to FIG. 2a, there is shown $V_{ac}$, the voltage on input conductor 32 as a function time. Also shown are the positive and negative threshold voltages, $V_{15b}$ and $V_{16a}$, which appear at amplifier inputs 15b and 16a, respectively. Before time $T_1$, when no a-c voltage appears on input conductor 32, the a-c voltage applied to neither amplifier exceeds the threshold voltage applied to the same amplifier, with the result that junction $J_1$ is negative from common C. Under these conditions, current flows from d-c source 18b through the path including conductor 45, a diode 47, a conductor 43, resistor 34 and conductor 22. This current renders junction $J_1$ negative from common C by a voltage equal to the forward voltage drop across diode 47. Since junction $J_1$ is connected to the base of transistor 38 and since common C is connected to the emitter thereof, NPN transistor 38 is non-conducting. This, in turn, causes output terminal 35 to be at the potential of positive supply conductor 20 and thereby indicate the absence of an a-c voltage between input terminals 12 and 13. The potential of output terminal 35, $V_{35}$, is illustrated in FIG. 2b.

Between times $T_1$ and $T_2$, when the voltage on input conductor 32 becomes positive but remains between the positive and negative threshold voltage at amplifier inputs 15b and 16a, junction $J_1$ remains negative from common C. As a result, output terminal 35 remains at the potential of conductor 20 to continue the indication that no a-c voltage is present between a-c input terminals 12 and 13. This merely reflects the effect of the threshold circuitry which allows the rejection of extraneous low level signals.

After time $T_2$, when the voltage on input conductor 32 rises above the threshold voltage at amplifier input 15b, amplifier output 15c and junction $J_1$ rise toward the voltage of positive supply conductor 20, as previously described. Because capacitor 42 is connected as shown in FIG. 1, however, there is a time-delay between the appearance of a positive-going voltage at junction $J_1$ and the resultant conduction of output voltage control transistor 38. This time-delay causes transistor 38 to approach conduction over a period of time as capacitor 42 charges to a voltage which renders junction $J_1$ sufficiently positive from common C to reverse bias diode 47 and forward bias transistor 38. The length of this time-delay is, of course, determined by the capacitance of capacitor 42, the initial charge thereon and the rate at which charging current can be supplied from amplifier 15 through conductor 43. It will be understood that if amplifier 15 (or 16) does not have internal current limiting circuitry, it may be necessary to connect a resistor in series with conductor 43 to limit the charging current which capacitor 42 draws from that amplifier.

In accordance with one feature of the present invention, the above time-delay is caused to occupy a relatively small fraction of one half-cycle of the a-c voltage by pre-conditioning the time-delay circuitry to allow a relatively rapid change in the conduction of transistor 38 upon the appearance of an a-c input voltage. In the present embodiment, this is accomplished by pre-charging capacitor 42 to a voltage such that only a relatively small additional charge is necessary to bring transistor 38 to the threshold of conduction. This pre-charging is provided by a clamping diode 47 which acts in conjunction with source 18b to prevent the potential of the upper plate of capacitor 42 (and junction $J_1$) from dropping below the potential of common C by more than a fixed voltage, approximately six-tenths of 1 volt in the present embodiment. As a result, capacitor 42 need only be charged to an additional 1.2 volts before it renders junction $J_1$ sufficiently positive from common C to forward bias transistor 38 and thereby initiate the activity thereof which culminates in the indication of the appearance of an a-c input voltage. An exemplary value of the time required for capacitor 42 to charge to the voltage necessary to forward bias transistor 38 is shown by the time interval $T_2$-$T_3$ of FIG. 2b. The latter time interval may, of course, be lengthened by omitting clamping diode 47 or by introducing a suitable charging current limiting resistor in series with conductor 43.

After time $T_3$, as capacitor 42 charges to a still higher voltage through junction $J_1$, the conduction of transistor 38 increases, thus causing the voltage between output terminals 35 and 36 to approach zero. Transistor 38 attains full conduction at time $T_4$, at which time the voltage between output terminals 35 and 36 is approximately zero, indicating that an a-c voltage is present. Thereafter, as capacitor 42 continues to charge, the voltage at junction $J_1$ attains its maximum value with respect to common C. Thus, soon after time $T_3$, transistor 38 attains full conduction and capacitor 42 overcharges to raise the potential of junction $J_1$ to a value substantially in excess of that required to maintain full conduction through transistor 38.

Referring to FIGS. 2a and 2b, it will be seen that the above described detection of the appearance of an a-c voltage occurs within one-quarter of one half-cycle of the a-c input voltage wave. It will be understood that this time may be shortened or lengthened, depending upon the values selected for the circuit elements of FIG. 1.

The above conditions will continue until time $T_5$ when the voltage on input conductor 32 drops below the positive threshold voltage at amplifier input 15b. Between that time and time $T_6$, when the voltage on input conductor 32 rises above negative threshold voltage at amplifier input 16a, neither amplifier 15 nor amplifier 16 can maintain the voltage at junction $J_1$ at its previously assumed positive value. As a result, during time interval $T_5$-$T_6$, the circuit of FIG. 1 begins to return to the conditions which were present before time $T_2$. In accordance with one feature of the present invention, the latter return is delayed for a time greater than the time required for the a-c voltage on conductor 32 to vary from a value equal to the positive reference voltage to a value equal to the negative reference voltage. This allows the circuit of FIG. 1 to withhold an indication of an a-c voltage interruption when the a-c voltage is undergoing a polarity reversal and yet allows the circuit of FIG. 1 to indicate actual a-c voltage interruptions soon after they occur.

In the present embodiment, the desired time-delay introduced to prevent false indications during a-c input voltage polarity reversals is accomplished by the introduction of capacitor 42 and resistors 40 and 34, as will now be described. Between times $T_5$ and $T_6$, neither amplifier 15 nor amplifier 16 can maintain a positive voltage at junction $J_1$. As a result, the voltage at the latter junction begins to decrease toward the value at which transistor 38 will turn off and thereby indicate an interruption in the a-c input voltage. The time required for this decrease to occur is extended, for a time, by capacitor 42 which supports the voltage at junction $J_1$ by discharging through a first path including resistor 40, the base-emitter circuit of transistor 38 and source 19 and through a second path including conductor 43 and resistor 34. Because capacitor 42 is, at this time, overcharged, that is, charged to a voltage substantially in excess of that required to maintain junction $J_1$ at a voltage sufficient to support full conduction through transistor 38, transistor 38 will remain fully conductive during time interval $T_5$–$T_6$. As a result, the voltage between output terminals 35 and 36 is prevented from even beginning to rise to the potential of positive supply conductor 20 during an a-c reversal. Thus, the circuit of FIG. 1 does not indicate an a-c voltage interruption during what is merely an a-c voltage reversal.

After an actual interruption in the a-c input voltage as, for example, the interruption which begins at time $T_7$ in FIGS. 2a and 2b, transistor 38 begins to turn off in the manner described in connection with time interval $T_5$–$T_{6a}$. Because the interruption does not terminate within an interval such as $T_5$–$T_6$, however, the time-delay provided by capacitor 42 soon exhausts itself. This results in the turn-off of transistor 38 and the resultant indication of an interruption of the a-c input voltage. In the example shown in FIG. 2b, the time-delay between an a-c voltage interruption and the resultant indication thereof at terminals 35 and 36 spans the time interval $T_7$–$T_9$, the latter having a duration approximately equal to one-quarter of one cycle of the input voltage. The duration of the turn-off time interval may, of course, be made shorter or longer by selecting different values for the circuit elements of FIG. 1.

The rise in output voltage which follows the a-c voltage interruption at time $T_7$ occurs in two stages, the first stage occurring between times $T_7$ and $t_8$ and the second stage occurring between times $T_8$ and $T_9$. During the first stage, capacitor 42 is discharging but is able to maintain at junction $J_1$ a voltage which will support full conduction through transistor 38. During the second stage, capacitor 42 has discharged to the point where continued discharge causes transistor 38 to become increasingly non-conductive, thus causing the voltage between terminals 35 and 36 to approach the voltage of positive supply conductor 20. After transistor 38 turns fully off, capacitor 42 continues to discharge until the potential of the upper plate thereof falls to a value (in the present embodiment) of approximately 0.6 volts negative from common C, the latter being the factor which initiates the previously described clamping activity of diode 47. When this occurs, the circuit of FIG. 1 is in the condition which it was in prior to time $T_2$ and is ready to detect the reappearance of an a-c input voltage.

If it is desirable to utilize circuitry having only one voltage comparator and one two-terminal d-c voltage supply, this may be accomplished by arranging the circuitry of the invention in the manner shown in FIG. 3. The latter circuit is in many respects similar to the circuit of FIG. 1 and like functioning parts are similarly numbered.

The circuit of FIG. 3 differs from that of FIG. 1 principally in that the comparing means of FIG. 3 comprises an operational amplifier 17 the output 17c of which can vary in either direction from its quiescent potential and the inputs 17a and 17b of which serve alternately and severally as threshold inputs and signal inputs. When, for example, a-c source 11 drives input terminal 12 positive from input terminal 13, amplifier input 17a serves as a signal input due to the conduction of a diode 50a while amplifier input 17b serves as a threshold input due to the non-conduction of a diode 50b and the d-c voltage divider action of resistors 27' and 28'. When, however, source 11 drives terminal 12 negative from terminal 13, amplifier input 17b serves as a signal input due to the conduction of diode 50b while amplifier input 17a serves as a threshold input due to the non-conduction of diode 50a and the d-c voltage divider action of resistor 30' and 29'.

To the end that the potential of junction $J_1$ of FIG. 3 may vary with the a-c input voltage in the manner described previously in connection with junction $J_1$ of FIG. 1, the voltage which voltage divider 27'–28' establishes at input 17b when no a-c input voltage is present (i.e. the quiescent voltage at input 17b) is set at a value greater than the quiescent voltage which voltage divider 30'–29' establishes at input 17a. In addition, the quiescent voltage of a junction $J_2$ is set, by a voltage divider comprising resistors 51 and 52, at a voltage between the quiescent voltages appearing at amplifier inputs 17b and 17a. Thus, when the a-c input voltage has an instantaneous value of zero, the potential of a junction $J_2$ is between that of amplifier inputs 17a and 17b, voltage divider 51–52 serving to introduce into the a-c input voltage the d-c level necessary to produce this condition.

The above voltage relationships cause amplifier output 17c and junction $J_1$ to assume a potential near that of positive supply conductor 20 when the voltage of junction $J_2$ is either greater than the quiescent voltage of amplifier input 17a or less than the quiescent voltage of amplifier input 17b. These relationships also cause amplifier output 17c and junction $J_1$ to assume a potential near that of ground G when the voltage at junction $J_2$ is between the quiescent threshold voltages at amplifier inputs 17a and 17b. Thus, the potential of junction $J_1$ of FIG. 3 tends to assume one or the other of two values depending upon whether the a-c input voltage is or is not within a preset range of threshold voltages.

The above described variations in the voltage at amplifier output 17c and junction $J_1$, in turn, control the voltage which transistor 38 establishes between output terminals 35 and 36. This control activity is affected by time-delay capacitor 42 which operates in the manner described previously in connection with FIG. 1 to prevent the voltage between output terminals 35 and 36 from indicating interruptions in the a-c input voltage during a-c input voltage polarity reversals. Thus, the circuit of FIG. 3 exhibits an operating characteristic substantially the same as that previously in connection with FIGS. 1, 2a and 2b.

In view of the foregoing, it will be seen that an a-c voltage detector constructed in accordance with the invention is adapted to indicate changes in the condition of an a-c input voltage within a fraction of one half-cycle thereof and yet is adapted to avoid responding to the signal noise or spikes which may accompany the a-c voltage being monitored. It will further be seen that the above described voltage detecting activity occurs without regard to the polarity of the a-c input at the time when the condition of the latter changes.

It will be understood that the embodiment shown herein is for illustrative purposes only and may be changed or modified without departing from the spirit and scope of the appended claims.

What is claimed is:

1. In a circuit for detecting the presence or absence of an a-c voltage, in combination, input terminal means, output terminal means, comparing means, said comparing means including signal input means, threshold input means and output means, threshold voltage supply means, means for connecting said threshold voltage supply means to said threshold input means to establish a threshold voltage range for said comparing means, means for connecting said input terminal means to said signal input means, output voltage control means for establishing a first voltage at said output terminal means when the voltage at said signal input means is outside said threshold voltage range and for establishing a second voltage at said output terminal means when the voltage at said signal input means is within said threshold voltage range, means for connecting said voltage control means to the output means of said comparing means and time-delay means for delaying the establishment of said second voltage for a time greater than the time required for the voltage at said signal input means to vary through said threshold voltage range.

2. A circuit as set forth in claim 1 in which said comparing means comprises an operational amplifier having non-inverting and inverting inputs which serve alternately and severally as signal input means and threshold input means.

3. A circuit as set forth in claim 2 in which said means for connecting said input terminal means to said signal input means includes unidirectional conducting means.

4. A circuit as set forth in claim 1 in which said comparing means comprises first and second operational amplifiers each having non-inverting and inverting inputs, one input of each amplifier serving as threshold input means and the other input of each amplifier serving as signal input means.

5. A circuit as set forth in claim 1 in which one of said input terminal means is at the same potential as one of said output terminal means.

6. In a circuit for detecting the presence or absence of an a-c voltage, in combination, input terminal means, output terminal means, comparing means having signal input means, threshold input means and output means, threshold voltage supply means, means for connecting said threshold voltage supply means to said threshold input means to establish a threshold voltage range for said comparing means, means for connecting said input terminal means to said signal input means, said comparing means serving to establish a first voltage at the output means thereof when the voltage at said signal input means is outside said threshold voltage range and to establish a second voltage at the output means thereof when the voltage at said signal input means is within said threshold voltage range, discriminator means for establishing a first output voltage at said output terminal means when said first voltage appears at the output means of said comparing means and for establishing a second output voltage at said output terminal means when said second voltage appears at the output means of said comparing means for a time sufficient to allow an a-c input voltage polarity reversal to occur, and means for connecting said discriminator means to said comparing means and to said output terminal means.

7. In a circuit for detecting the presence or absence of an a-c voltage, in combination, input terminal means, output terminal means, first and second differential switching means each having signal input means, threshold input means and output means, means for establishing threshold voltages at said threshold input means, means for connecting said input terminal means to said signal input means, output voltage control means for establishing a first voltage at said output terminal means when the voltage at either of said signal input means exceeds the voltage at the respective threshold input means and for establishing a second voltage at said output terminal means when the voltages at both of said signal input means are less than the voltages at the respective threshold input means, means for connecting said voltage control means to the output means of said differential switching means and time-delay means for delaying the establishment of said second voltage for a time greater than the time required for the voltage at said signal input means to vary between said threshold voltages.

8. A circuit as set forth in claim 7 including means for preconditioning said time-delay means to prevent the latter from appreciably affecting the time required for said output voltage control means to establish said first voltage.

9. In a circuit for detecting the presence or absence of an a-c voltage, in combination, input terminal means, output terminal means, a positive comparator and a negative comparator each having signal input means, threshold input means and output means, means for establishing positive and negative threshold voltages at the threshold input means of said positive and negative comparators respectively, means for connecting said input terminal means to the signal input means of said comparators, output voltage control means for establishing a first voltage at said output terminal means when the voltage at said signal input means is outside the voltage range bounded by said positive and negative threshold voltages and for establishing a second voltage at said output terminal means when the voltage at said signal input means is within said voltage range, time-delay means for delaying the establishment of said second voltage for a time sufficient to allow the voltage at said signal input means to vary between said positive and negative threshold voltages during a-c polarity reversals and means for connecting said time-delay means between said voltage control means and the output means of said comparators.

10. In a circuit for detecting the presence or absence of an a-c voltage, in combination, input terminal means, output terminal means, first and second amplifying means each having signal input means, threshold input means and output means, means for establishing positive and negative threshold voltages at the threshold input means of said first and second amplifying means respectively, means for connecting said input terminal means to said signal input means, means for connecting together the output means of said amplifying means, voltage supply means having a positive terminal, a negative terminal and a common electrically therebetween, means for connecting said positive and negative terminals to said amplifying means, output voltage control means for controlling the voltage between said output terminal means, means for connecting said voltage control means between said common and one terminal of said voltage supply means, capacitance means and means for connecting said capacitance means to said voltage control means and to the output means of said amplifying means.

11. A circuit for detecting the presence or absence of an a-c voltage, in combination, a-c input terminal means, output terminal means, differential switching means having first and second input means and output means, means for establishing a first quiescent threshold voltage at said first input means, means for establishing a second quiescent threshold voltage at said second input means, means for connecting said a-c input terminal means to said first and second input means to apply thereto respective positive and negative half-cycles of the a-c input voltage, means for introducing a predetermined d-c level into the voltage applied to said first and second input means, output voltage control means for establishing a first output voltage at said output terminal means when the voltage applied to the input means of said differential switching means is not between said first and second quiescent threshold voltages and for establishing a second output voltage at said output terminal means when the voltage applied to the input means of said differential switching means is between said first and second quiescent threshold voltages, means for connecting said output voltage control means the output means of said differential switching means and time-delay means for delaying the establishment of said second output voltage for a time greater than the time required for the voltage applied to the input means of said differential switching means to vary between said first and second quiescent threshold voltages.

12. A circuit for detecting the presence or absence of an a-c voltage, in combination, a-c input terminal means, output terminal means, amplifying means having first and second input means and output means, means for establishing first and second quiescent threshold voltages at said first and second input means respectively, first unidirectional conducting means for connecting said first input means to said a-c input terminal means when the a-c voltage at said a-c input terminal means has a first polarity, second unidirectional conducting means for connecting said second input means to said a-c input terminal means when the voltage at said a-c input terminal means has a second polarity, d-c voltage supply means, a voltage divider, means for connecting said input terminal means to said d-c voltage supply means through said voltage divider, output voltage control means, means for connecting said output voltage control means to said d-c voltage supply means and to the output means of said amplifying means, time-delay means and means for connecting said time-delay means to the output means of the said amplifying means and to said output voltage control means.

* * * * *